(12) United States Patent
Shrestha et al.

(10) Patent No.: US 8,693,528 B1
(45) Date of Patent: Apr. 8, 2014

(54) COMMON MODE SUPPRESSION CIRCUIT

(71) Applicant: NXP B.V., Eindhoven (NL)

(72) Inventors: Rameswor Shrestha, Eindhoven (NL); Hendrik Boezen, Nijmegen (NL); Martin Bredius, San Jose, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/690,500

(22) Filed: Nov. 30, 2012

(51) Int. Cl.
*H04B 1/38* (2006.01)

(52) U.S. Cl.
USPC ........... 375/219; 375/316; 375/295; 375/220; 375/257; 375/258; 375/285; 375/288; 375/346; 375/349; 455/280; 455/282; 455/283; 455/284; 455/292

(58) Field of Classification Search
CPC ..................... H03F 2200/541; H03F 2200/534; H03F 2200/537; H03F 1/26; H03F 2200/372; H03F 2203/45082; H03F 2203/45084; H04L 25/0276; H04L 25/0266; H04B 3/28
USPC ......... 375/316, 295, 219, 220, 257, 258, 285, 375/288, 346, 349; 455/280, 282, 283, 284, 455/292
See application file for complete search history.

(56) References Cited

U.S. PATENT DOCUMENTS

| 8,049,573 | B2 | 11/2011 | Alfano et al. |
| 2007/0202828 | A1* | 8/2007 | Walter et al. ............... 455/279.1 |
| 2009/0017773 | A1 | 1/2009 | Dupuis et al. |
| 2011/0007433 | A1* | 1/2011 | Pyrhonen et al. ............... 361/18 |
| 2011/0074533 | A1* | 3/2011 | Phadke ......................... 336/150 |
| 2013/0235619 | A1* | 9/2013 | Zhou et al. .................. 363/21.04 |

OTHER PUBLICATIONS

Wong et al., "An Integrated Capacitively Coupled Transformer and its Application for RF IC's," IEEE 2000 Custom Integrated Circuits Conference, pp. 349-352, 2000.

* cited by examiner

*Primary Examiner* — Siu Lee

(57) ABSTRACT

In one or more embodiments, a circuit is configured to receive a differential signal from a transmitter that is isolated from the receiver circuit and that includes a common-mode suppression circuit and signal combining circuit coupled to the corresponding lines carrying the differential signals. The common-mode suppression and signal combining circuits are configured to suppress common-mode signals of differential signals communicated on the set of differential signal lines and combine to form of differential-mode components of the differential signals.

20 Claims, 3 Drawing Sheets

COMMON MODE SUPPRESSION CIRCUIT

Aspects of the present disclosure relate to apparatuses, devices, and methods involving communication between isolated voltage domains. Galvanic isolation, for example, has often been used in this regard for a variety of different applications. Such isolation can be provided between multiple integrated circuit chips, which can be located within the same package or in different packages.

These applications often have circuits provide for such isolation using one of various types of isolation barriers in a signal path between the isolated circuits. Capacitive, inductive and optical coupling circuits are common examples of such circuits that provide isolation in order to operate the isolated circuits in their respective and separate voltage domains and with different common (or ground) voltage references. For instance, applications such as electric vehicles and motor drivers employ high voltage and low voltage domains, in which the low voltage domain may be used for controlling aspects of the high voltage domain. In such applications, the respective domains are desirably isolated from each other. As such, voltage differences may arise between the corresponding voltage domains, which can result in damage to the circuits due to current surges and high voltage transients.

One type of isolation technique involves the use of differential signaling and capacitive coupling. These and other galvanic isolation techniques have various undesirable tradeoffs in properties such as, but not necessarily limited to, signal propagation delays, power consumption, pulse width distortion, common mode transient immunity and carrier frequency requirements. Differential signaling solutions use two separate wires upon which corresponding signals are then transmitted differentially (i.e., as voltage differences between the signal lines). For instance, first and second signals that are 180 degrees out of phase with each other may be transmitted on respective ones of the differential signal lines. A receiver may retrieve a data signal by comparing the voltage difference of differential signal lines. The differentially transmitted signals can be modulated in a number of different manners in order to convey data. A few non-limiting examples include frequency modulation, amplitude modulation, and on-off key (OOK) modulation.

In communicating differential signals between isolated systems, the component of an analog signal that is present with one sign (positive or negative) on the signal-carrying lines is known as a common mode signal which is the half-sum of the corresponding voltages. Transient common-mode signals may also be induced in both differential signal lines as noise by electromagnetic interference.

Aspects of the present disclosure relate generally to methods, circuits, and devices for the communication of data between isolated circuits. In some embodiments, an apparatus (e.g., receiver circuit) is provided that includes differential signal lines, including an upper signal line and a lower signal line, for carrying differential signals from a sending side of the differential signal lines to a receiving side of the differential signal lines. A common-mode suppression circuit is coupled to the differential signal lines and is configured to suppress common-mode signals on the differential signal lines. The common-mode suppression circuit includes a transformer configured and arranged with a primary-side inductor arrangement and a secondary-side inductor arrangement. The primary side is coupled to receive signals from differential inputs of the apparatus. The secondary-side inductor arrangement includes an upper coil with one terminal electrically connected to the upper signal line and another terminal crossing to electrically connect to the lower signal line. The secondary-side inductor arrangement also includes a lower coil with one terminal electrically connected to the lower signal line and another terminal crossing to electrically connect to the upper signal line. The apparatus includes a signal combining circuit coupled to the first and second signal lines. The signal combining is responsive to the common-mode suppression circuit and is configured to combine a form of the differential signals as carried on the receiving side of the differential signal lines.

In some embodiments, an apparatus is provided that includes a set of differential signal lines, including an upper signal line and a lower signal line. The upper and lower signal lines are configured and arranged on opposing sides of a voltage isolation barrier for carrying differential signals from a sending side of the differential signal lines, across the voltage isolation barrier, to a receiving side of the differential signal lines. A common-mode suppression circuit is coupled to the first and second differential signal lines and includes a transformer configured and arranged with a first inductor arrangement on a first side of the transformer and a second inductor arrangement on a second side of the transformer. The transformer is configured to transfer energy from the first side to the second side via the first and second inductor arrangements. The second inductor arrangement includes upper and lower coils respectively connected to the upper and lower signal lines and crossing to electrically connect to the lower and upper signal lines. The apparatus also includes a signal combining circuit, responsive to the common-mode suppression circuit, for combining a form of the differential signals as carried on the receiving side of the differential signal lines.

In some embodiments, a method is provided for processing differential signals. Differential signals are carried from a sending side of a set of differential signal lines, including an upper and a lower signal line, to a receiving side of the differential signal lines. A transformer having a primary-side inductor arrangement and a secondary-side inductor arrangement is provided. The secondary-side inductor arrangement includes an upper and a lower coil, each having one terminal electrically connected to the upper signal line and another terminal electrically connected to the lower signal line. The transformer is used to suppress common-mode disturbance on the receiving side of the differential signal lines. In response to the transformer, a form of the differential signals are combined.

The above summary is not intended to describe each embodiment or every implementation of the present disclosure. The figures, detailed description, and claims that follow more particularly exemplify various embodiments.

Aspects of the present disclosure may be more completely understood in consideration of the detailed description of various embodiments of the present disclosure that follows in connection with the accompanying drawings, in which.

Figure 1:
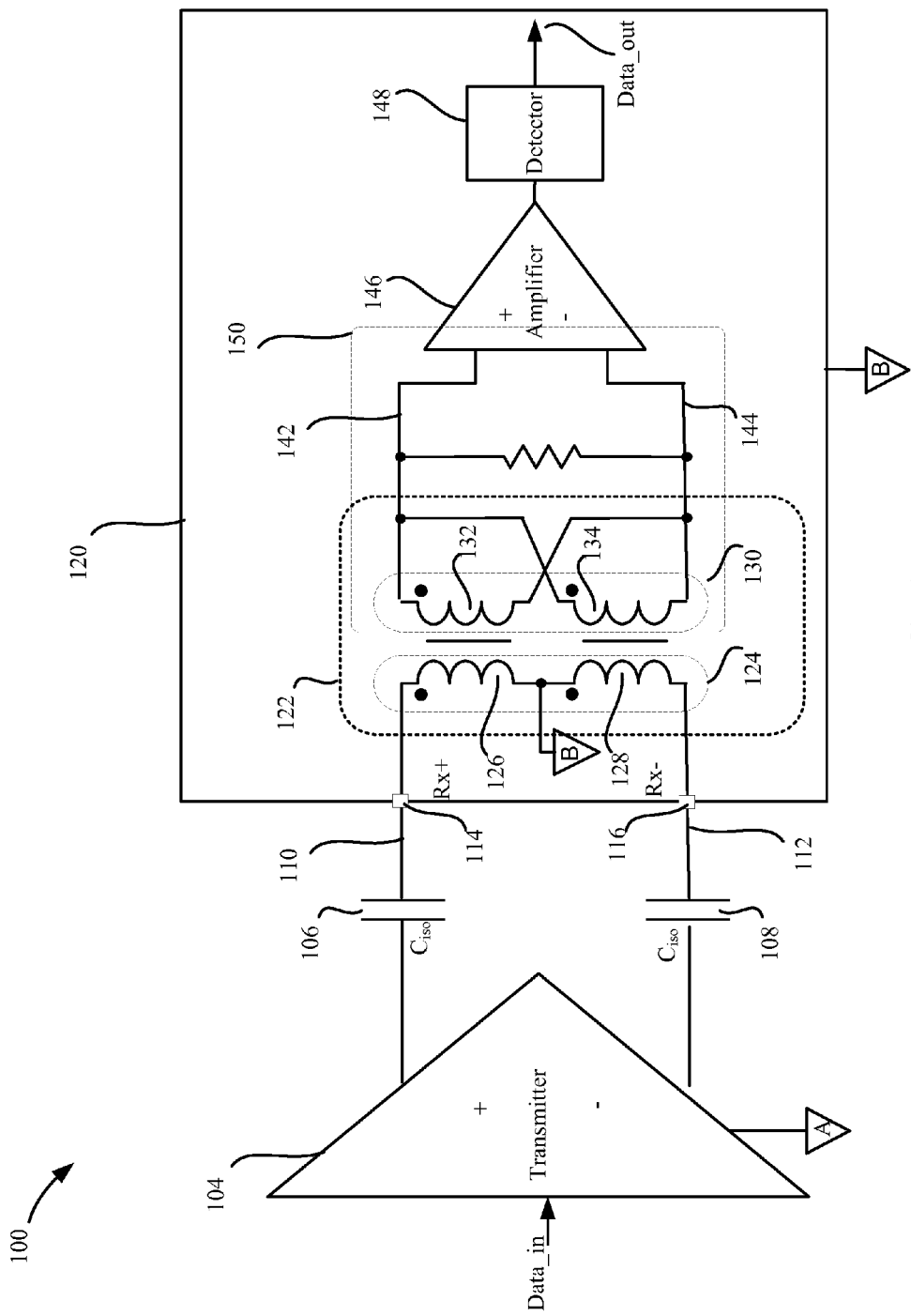
FIG. 1 shows a block diagram of a system for communicating between a transmitter and a receiver, with operation in different voltage domains, consistent with one or more embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. While the present disclosure is not necessarily limited in this context, various aspects of the disclosure may be appreciated through a discussion of related examples.

Aspects of the present disclosure relate to the transmission of data between circuits that are isolated from one another. For example, circuits may be isolated using capacitive coupling on signal paths between the circuits. As a result of such isolation, the circuits operate in separate voltage domains that are not referenced to one another by a common ground voltage level. As such, voltage differences may arise between the corresponding voltage domains. For certain applications, such as in automotive environments, the voltage differences have the potential to be large (e.g., hundreds or thousands of volts in electrically-powered vehicles). Although the circuits may be capacitively isolated, current may be passed by isolation capacitors used for capacitive coupling in response to common-mode transients between the voltage domains. As a result, the ability of isolation capacitors to provide transient immunity is limited thereby decreasing the reliability of data communication between the voltage domains. Embodiments of the present disclosure are believed to be applicable to communication methods, devices, and systems involving data communication protocols between isolated circuits.

In some embodiments, a receiver circuit is configured to receive a differential signal from a transmitter that is isolated from the receiver circuit over capacitively-coupled signal lines. The receiver circuit includes a set of differential signal lines for communicating differential signals from a sending end of the set of differential signal lines to a receiving end of the set of differential signal lines. A common-mode suppression circuit is coupled to the set of differential signal lines and is configured to suppress common-mode voltages of signals communicated to the receiving end of the set of differential signal lines.

The common-mode suppression circuit includes a transformer having a primary-side inductor arrangement and a secondary-side inductor arrangement. The secondary-side inductor arrangement includes an upper coil and lower coil, each having one end connected to an upper signal line of the set of differential signal lines and another end crossing to electrically connect to a lower signal line of the set of differential signal lines. A signal combining circuit is the receiving side of the set of differential signal lines. The common-mode suppression circuit and the signal combining circuit combine a form of the differential signals and suppress common-mode signals from signals communicated to the receiving ends of the set of differential signal lines. In some embodiments, the common-mode suppression circuit and the signal combining circuit are configured to add opposite phases of differential signals.

In some embodiments, the primary-side inductor arrangement is configured to reject common-mode transients by sourcing or sinking the common-mode currents to a ground reference voltage. For instance, in one embodiment, the primary-side inductor arrangement includes an upper coil and a lower coil connected together in series between the upper and lower signal lines. A node between the upper and lower coil is coupled to a reference ground voltage.

In some embodiments, the common-mode suppression circuit is configured to remove common-mode signals communicated to the receiving ends of the upper and lower signal lines by circulating common-mode currents induced in the upper and lower coils of the secondary-side inductor arrangement between the upper and lower coils in a circular path.

In some embodiments, the common-mode suppression circuit provides a voltage isolation barrier that isolates the sending side of the set of differential signal lines from a receiving side of the set of differential signal lines.

In some embodiments, the common-mode suppression circuit includes a small signal transformer having the primary side inductor arrangement and the secondary side inductor arrangement implemented within layers of a single integrated circuit.

In some embodiments, an apparatus (e.g., a receiver) is provided that includes a set of differential signal lines, including an upper signal line and a lower signal line. The upper and lower signal lines are configured and arranged on opposing sides of a voltage isolation barrier for carrying differential signals from a sending side of the differential signal lines, across the voltage isolation barrier, to a receiving side of the differential signal lines. A common-mode suppression circuit is coupled to the upper and lower signal lines. The common-mode suppression circuit includes a transformer having a first inductor arrangement on a first side of the transformer and a second inductor arrangement on a second side of the transformer. The second inductor arrangement includes upper and lower coils, each having a first end connected to the one of the differential signal lines and a second end crossing to electrically connect to the other one of the differential signal lines. The apparatus includes a signal combining circuit, responsive to the common-mode suppression circuit for combining a form of the differential signals as carried on the receiving side of the differential signal lines.

In some embodiments, a method is provided for processing differential signals. Differential signals are carried from a sending side of a set of differential signal lines, including an upper and a lower signal line, to a receiving side of the differential signal lines. A transformer having a primary-side inductor arrangement and a secondary-side inductor arrangement is provided. The secondary-side inductor arrangement includes an upper coil, having one terminal electrically connected to the upper signal line and another terminal crossing to electrically connect to the lower signal line, and a lower coil, having one terminal electrically connected to the lower signal line and another terminal crossing to electrically connect to the upper signal line. The transformer is used to suppress common-modes on the receiving side of the differential signal lines. In response to the transformer, the differential signals are combined.

Turning now to the figures, FIG. 1 depicts a block diagram of a system for communicating between a transmitter and a receiver, with operation in different voltage domains, consistent with one or more embodiments of the present disclosure. The system 100 includes a transmitter 104 and a receiver 120, which are isolated from one another and operate in separate voltage domains A and B. The system is configured to communicate data values over a set of differential signal lines (110 and 112). Capacitive coupling of the signal line is provided by isolation capacitors 106 and 108. For instance, in one embodiment, a first end of each signal line 110 and 112 (connected to differential outputs of the transmitter 104) is connected to a first plate of a respective capacitor (106 and 108) and a second end of each signal line (connected to differential inputs 114 and 116 of the receiver 110) is connected to a second plate of the corresponding capacitor. Each capacitor provides isolation between the first and second ends of the corresponding signal line.

The transmitter 104 is configured to modulate a received data signal and transmit the modulated data signal to the receiver 120 as a differential signal. The receiver circuit 120 includes a second set of differential signal lines, including an upper signal line 142 and a lower signal line 144, for carrying differential signals from a sending side of the signal lines connected to respective differential inputs (114 and 116) to a receiving side of the differential signal lines connected to an amplifier (e.g., comparator 146). The comparator 146 and a detector 148 are configured to demodulate differential signals communicated to the receiving side of the second set of differential signal lines (142 and 144). The comparator 146 compares voltages on the second set of differential signal lines (142 and 144) to generate a voltage difference. The detector 148 generates a demodulated signal (Data_out) based on the voltage difference generated by the comparator 146. In some various embodiments, data communicated from the transmitter 104 to the receiver 120 as differential signals may be modulated using various modulation schemes. For instance, for certain high-speed applications, different types of modulation schemes can be used for carrying information across the isolation region, including but not limited to OOK (on-off keying), amplitude, phase-based and/or frequency-based modulation. In some implementations, the demodulation of the differential signals performed by the comparator 146 and detector 148 also demodulates the signals according to an additional modulation scheme, such as OOK.

A common-mode suppression circuit 122 and signal combining circuit 150 are coupled to the upper and lower signal lines (142 and 144) and are configured to suppress common-mode voltages and add opposite phases of the differential signals communicated on the differential signal lines (142 and 144). The common-mode suppression circuit includes a small signal transformer having a primary-side inductor arrangement 124 coupled to the sending side of upper and lower signal lines (142 and 144) and a secondary-side inductor arrangement 130 coupled to the receiving side of the upper and lower signal lines (142 and 144).

On the primary-side of the transformer, common-mode transients on the upper and lower signal lines (142 and 144) are mitigated by sourcing or sinking common-mode currents to a ground reference voltage B. The primary-side inductor arrangement 124 includes an upper coil 126 and a lower coil 128 connected in series between the upper and lower differential signal lines (142 and 144). The primary-side upper and lower coils (126 and 128) provide coupling for respective ones of the upper and lower signal lines (142 and 144) to a reference ground voltage B. The transformer inductively communicates signals from the primary-side inductor arrangement to the secondary-side inductor arrangement.

The secondary-side inductor arrangement 130 includes an upper coil 132 and a lower coil 134 inductively coupled to respective coils 126 and 128 of the primary-side inductor arrangement. The common-mode suppression circuit 122 and signal combining circuit 150 provide circuit paths, which couple first ends of the upper and lower coils (132 and 134) to the upper signal line 142 and second ends of the upper and lower coils (132 and 134) to the lower signal line 144. In this arrangement, common-mode currents induced in the upper and lower coils (132 and 134) circulate between the coils in a circular path, thereby helping to mitigate the propagation of common-mode currents toward the receiving ends of the upper and lower signal lines (142 and 144). Common-mode currents on the primary side of the transformer are effectively shorted to the ground reference voltage B by upper and lower coils (126 and 128), thereby also facilitating with the suppression of common-mode signals.

Figure 2:
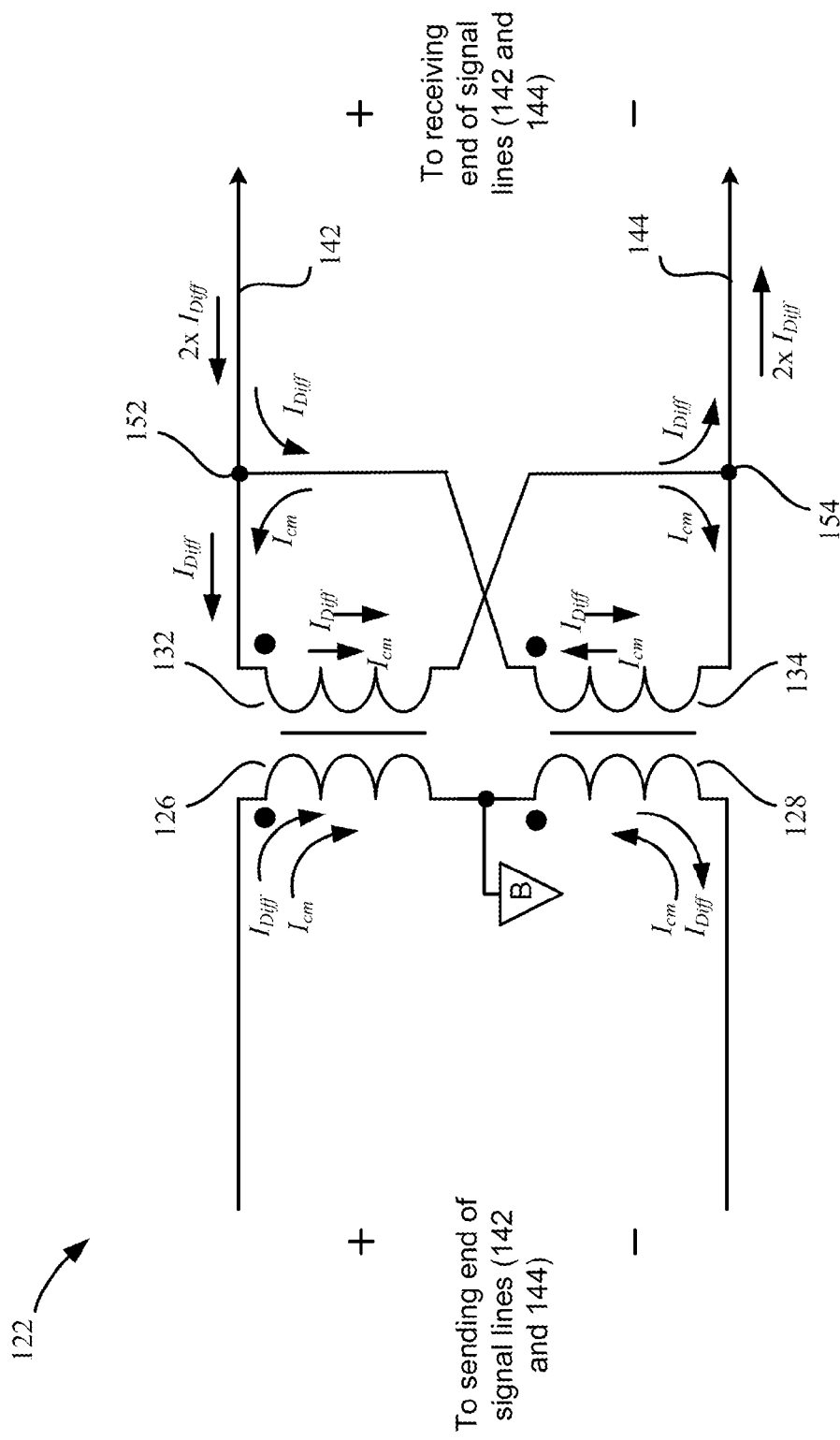
FIG. 2 illustrates flow of common-mode and differential-mode currents in a common-mode suppression circuit, in accordance with one or more embodiments of the present disclosure.

FIG. 2 illustrates flow of common-mode and differential currents in common-mode suppression circuit 122 in accordance with one or more embodiments. Common-mode currents $I_{CM}$ on the receiving ends of the differential signal lines are sinked and sourced to the reference ground voltage B by upper and lower coils (126 and 128). The common-mode currents on the receiving side of each of the differential signal lines 142 and 144 travel in the same direction. The common-mode currents $I_{CM}$ passing through primary coils (126 and 128) induce proportional common-mode currents $I_{CM}$ in secondary coils (132 and 134). Because the common-mode current $I_{CM}$ induced in the upper secondary coil 132 is approximately equal to the common-mode current induced in the lower secondary coil 134, the common-mode current $I_{CM}$ circulates in a circular path through upper and lower coils (132 and 134). For instance, upper coil 132 draws a common-mode current $I_{CM}$ from node 152 and lower coil 134 provides an equal common-mode current $I_{Cm}$ to node 152. Similarly, lower coil 134 draws a common-mode current $I_{CM}$ from node 154 and upper coil 132 provides an equal common-mode current $I_{CM}$ to node 154. In this manner, common-mode currents are removed from differential signals communicated to the receiving ends of the differential signal lines 142 and 144. As indicated above, because the common-mode currents may circulate between the secondary coils (132 and 134), common-mode currents on the primary side of the transformer are allowed to pass through primary coils (126 and 128) to the reference ground voltage B.

As further shown in FIG. 2, the arrangement of the secondary coils 132 and 134 by the common-mode suppression circuit and signal combining circuit operates to effect the addition of differential-mode currents $I_{Diff}$ induced in the secondary coils on the receiving side of each of the differential signal lines (142 and 144). The differential-mode signals communicated on the receiving side of the differential signal lines (142 and 144) are out of phase, and the related differential-mode currents flow in opposite directions in signal lines (142 and 144). On the secondary-side of the transformer, from respective upper and lower coils 132 and 134, the differential-mode currents ($I_{Diff}$) are summed to produce a current $2 \times I_{Diff}$ on the receiving side.

Figure 3:
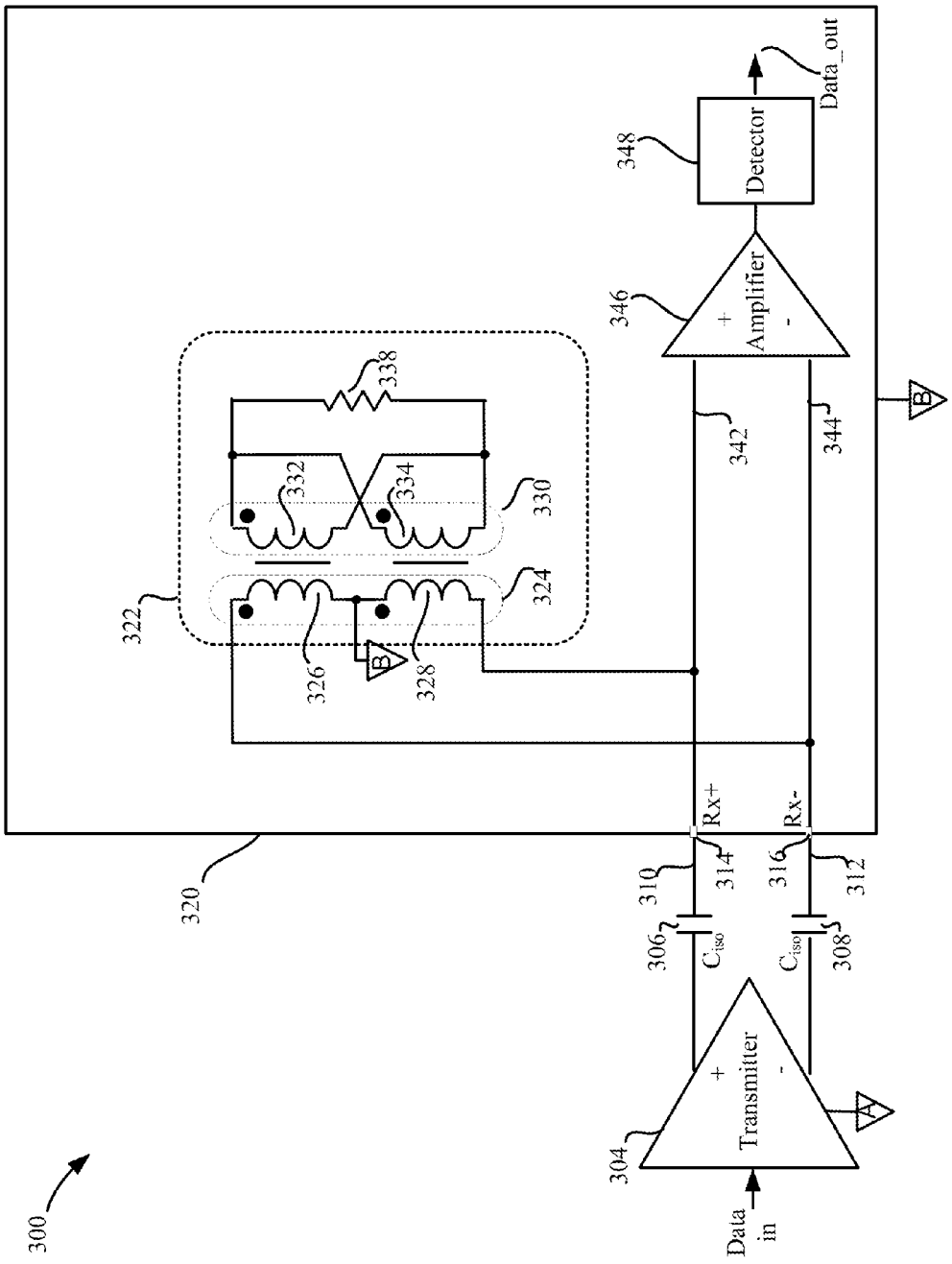
FIG. 3 shows a block diagram of a system for communicating between a transmitter and a receiver, with operation in different voltage domains, consistent with one or more embodiments of the present disclosure.

FIG. 3 depicts a block diagram of another system for communicating between a transmitter and a receiver, with operation in different voltage domains, consistent with one or more embodiments of the present disclosure. Similar to the system described with reference to FIG. 1, the system 300 includes a transmitter 304 and a receiver 320, isolated from one another, and configured to communicate data values over a set of differential signal lines (310 and 312). Capacitive-coupling of the signal line is provided by isolation capacitors 306 and 308.

The receiver circuit 320 includes a second set of differential signal lines, including an upper signal line 342 and a lower signal line 344, for carrying differential signals from a sending side of the signal lines connected to respective differential inputs (314 and 316) to a receiving side of the differential signal lines connected to a comparator 346. The comparator 346 and a detector 348 are configured to demodulate differential signals communicated to the receiving side of the second set of differential signal lines (342 and 344) as described above with reference to comparator 146 and detector 148.

A common-mode suppression circuit 322 is coupled to the upper and lower signal lines (342 and 344) and is configured to suppress common-mode voltages of signals. The common-mode suppression circuit 322 includes a small signal transformer having a primary-side inductor arrangement 324 coupled to the differential signal lines 342 and 344. On the primary side of the transformer, common-mode transients on the upper and lower signal lines are rejected by sourcing or sinking the common-mode currents to a ground reference voltage B. The primary-side inductor arrangement 324 includes an upper coil 326 and a lower coil 328 connected in series between the upper and lower differential signal lines (342 and 344). The upper and lower coils provide coupling for respective ones of the upper and lower signal lines (342 and 344) to a reference ground voltage B. The transformer inductively communicates signals from the primary-side inductor arrangement to the secondary side inductor arrangement. The secondary-side inductor arrangement 330 includes an upper coil 332 and a lower coil 334 inductively coupled to upper and lower coils (326 and 328) of the primary-side inductor arrangement, respectively. A first end of each of the upper and lower coils (332 and 334) is coupled to a first end of resistive path 338 and a second end of each of the upper and lower coils (332 and 334) is coupled to a second end of resistive path 338. In this arrangement, common-mode currents induced in the upper and lower coils (332 and 334) circulate between the coils in a circular path in a manner similar to common-mode circuit 120. As common-mode currents circulate between the upper and lower coils (332 and 334) on the secondary side of the transformer, common-mode currents on the primary side of the transformer are effectively shorted to the ground reference voltage B by upper and lower coils (326 and 328). Because the common-mode signals are shorted to the ground reference voltage B, the common-mode currents are not passed to the receiving end to the differential signal lines (342 and 344). In this manner, common-mode signals are suppressed as similarly discussed in connection with FIG. 2.

The differential-mode currents that are shorted to the ground reference voltage through upper and lower coils 326 and 328 are limited by differential-mode currents that are allowed to pass though inductive coils 332 and 334 on the secondary side of the transformer. On the secondary side of the transformer, differential-mode currents induced in inductor coils 332 and 334 are summed in a manner similar to that described with reference to common-mode circuit 120 shown in FIG. 2. In this arrangement, the summed common-mode signals circulate through resistive path 338. Due to the resistance in resistive path 338, flow of differential-mode currents induced in upper and lower coils (332 and 334) on the secondary side of the transformer are limited. As a result, flow of differential-mode currents through upper and lower coils (326 and 328) to the ground reference voltage B on the primary side of the transformer is also limited. Due to the limited flow of common-mode currents through upper and lower coils (326 and 328), only a portion of differential-mode signals are sinked or sourced to the reference ground voltage. The remaining portion of the differential-mode signals is communicated to the receiving end of the differential signal lines 342 and 344.

Resistance in the resistive path 338 may be selected as required for a particular application to adjust the amount of differential signal that is referenced (sinked or sourced) to the reference ground voltage. For instance, in one application, resistance of resistive path may be selected to reduce differential-mode transient noise on the differential signal lines 342 and 344.

The skilled artisan would appreciate that the receivers of the systems discussed with reference to the illustrated embodiments would include and/or operate with additional circuitry for signal processing. For example, in some embodiments, the receiver 120 shown in FIG. 1 includes an impedance matching circuit coupled to the receiving ends of the upper and lower signal lines (142 and 144) to adjust impedance of the receiver circuit 120. As another example, in some embodiments, the receiver 120 includes a driver circuit, following the detection circuit 148, to boost the demodulated signal (data_out) that is output from the detection circuit 148. As yet another example, in some embodiments, the receiver 120 includes a filtering circuit (e.g., low-pass filter, band-pass filter, etc.) to filter out transient signals unrelated to a carrier signal used for modulation.

In some instances, communications can be carried out between multiple circuits placed within a single chip-package (e.g., BGA package) and also having voltage isolation barrier therebetween. The various communications can be carried out using different isolation buffer circuits and amplifiers. Various applications are also contemplated including, but not limited to, applications in which small voltage differences exist between transmitters and receivers and applications in which large voltages can exist (e.g., hundreds or thousands of volts as can be used in automotive applications where electric motors are used in place of (or in combination with) combustion engines). Consistent with one or more embodiments discussed herein, U.S. Pat. No. 6,920,576 (filed May 31, 2001; Ehmann, Gregory E.), U.S. Pat. No. 6,882,046 (filed Dec. 18, 2001; Davenport, et al.) and "Signal Isolation Buffer Amplifiers" Burr-Brown, ISO102, ISO106, January 1995, each describe useful technical details, applications and various background information, and each of these documents is fully incorporated herein by reference.

The embodiments are thought to be applicable to a variety of related applications. Other aspects and embodiments will be apparent to those skilled in the art from consideration of the specification. While the present disclosure is amenable to various modifications and alternative forms, specifics thereof have been shown by way of example in the drawings and will be described in further detail. It should be understood that the intention is not to limit the disclosure to the particular embodiments and/or applications described. On the contrary, the intention is to cover all modifications, equivalents, and alternatives falling within the spirit and scope of the present disclosure.

What is claimed is:

1. An apparatus comprising:
differential signal lines, including an upper signal line and a lower signal line, for carrying differential signals from a sending side of the differential signal lines to a receiving side of the differential signal lines;
a common-mode suppression circuit in the receiving side including a transformer configured and arranged with a primary-side inductor arrangement and a secondary-side inductor arrangement, and with the secondary-side inductor arrangement having an upper coil with one terminal electrically connected to the upper signal line and another terminal crossing to electrically connect to the lower signal line and having a lower coil with one terminal electrically connected to the lower signal line and another terminal crossing to electrically connect to the upper signal line; and
a signal combining circuit, responsive to the common-mode suppression circuit, for combining a form of the differential signals as carried on the receiving side of the differential signal lines.

2. The apparatus of claim 1, wherein the differential signal lines include a pair of differential signal lines arranged for carrying 180-degree-opposite phases of the differential signal.

3. The apparatus of claim 2, further including a voltage isolation barrier for isolating the sending side of the differential signal lines from the receiving side of the differential signal lines.

4. The apparatus of claim 1, wherein the common-mode suppression circuit includes a small-signal transformer with the coils of at least one of the primary-side inductor arrangement and the secondary-side inductor arrangement being configured within layers of a single chip.

5. The apparatus of claim 1, wherein the secondary-side inductor arrangement and the signal combining circuit are configured and arranged to add opposite phases of the differential signal and cancel common-mode signals.

6. The apparatus of claim 1, further including a low impedance circuit being electrically connected to the differential signals lines on the receiving side.

7. The apparatus of claim 1, further including a center tap located on the sending side and configured for differential signal balance.

8. The apparatus of claim 1, further including a first means, including the common-mode suppression circuit, for providing common-mode suppression, and a second means, including the signal combining circuit, for combining the form of the differential signals.

9. The apparatus of claim 1, wherein the secondary-side inductor arrangement is configured and arranged to facilitate the suppression of common-mode signals communicated by circulating common-mode currents induced in the upper and lower coils.

10. The apparatus of claim 1, wherein the common-mode suppression circuit is configured and arranged to facilitate the suppression of common-mode signals communicated by circulating common-mode currents induced in the upper and lower coils of the secondary-side inductor arrangement between the upper and lower coils in a circular path.

11. The apparatus of claim 1, wherein the primary-side inductor arrangement includes:
an upper coil having a first end coupled to the upper signal line and a second end coupled to a reference ground voltage; and
a lower coil having a first end coupled to the lower signal line and a second end coupled to the reference ground voltage.

12. An apparatus comprising:
differential signal lines, including an upper signal line and a lower signal line, configured and arranged on opposing sides of a voltage isolation barrier for carrying differential signals from a sending side of the differential signal lines, across the isolation barrier, to a receiving side of the differential signal lines; a common-mode suppression circuit including a transformer configured and arranged with:
a first inductor arrangement on a first side of the transformer and a second inductor arrangement on a second side of the transformer, the transformer being configured to transfer energy from the first side to the second side via the first and second inductor arrangements, and the second inductor arrangement having upper and lower coils respectively connected to the upper and lower signal lines and crossing to electrically connect to the lower and upper signal lines; and
a signal combining circuit, responsive to the common-mode suppression circuit, for combining a form of the differential signals as carried on the receiving side of the differential signal lines.

13. The apparatus of claim 12, wherein the second inductor arrangement is configured and arranged to facilitate the suppression of common-mode signals communicated by circulating common-mode currents induced in the upper and lower coils.

14. The apparatus of claim 12, wherein the common-mode suppression circuit is configured and arranged to facilitate the suppression of common-mode signals communicated by circulating common-mode currents induced in the upper and lower coils of the second inductor arrangement between the upper and lower coils in a circular path.

15. The apparatus of claim 12, wherein the first inductor arrangement includes:
an upper coil having a first end coupled to the upper signal line and a second end coupled to a reference ground voltage; and
a lower coil having a first end coupled to the lower signal line and a second end coupled to the reference ground voltage.

16. The apparatus of claim 12, wherein the secondary inductor arrangement and the signal combining circuit are configured and arranged to add opposite phases of the differential signal and cancel common-mode signals.

17. The apparatus of claim 12, wherein the first inductor arrangement and the second inductor arrangement are configured within layers of a single chip.

18. A method, comprising:
carrying differential signals from a sending side of differential signal lines to a receiving side of the differential signal lines, the differential signal lines including an upper signal line and a lower signal line;
providing a transformer with a primary-side inductor arrangement and a secondary-side inductor arrangement, and with the secondary-side inductor arrangement having an upper coil with one terminal electrically connected to the upper signal line and another terminal crossing to electrically connect to the lower signal line and having a lower coil with one terminal electrically connected to the lower signal line and another terminal crossing to electrically connect to the upper signal line;
using the transformer to suppress common-modes on the receiving side of the differential signal lines and, responsive thereto, combining a form of the differential signals as carried on the receiving side of the differential signal lines.

19. The method of claim 18, further including the step of circulating common-mode currents induced in the upper and lower coils.

20. The method of claim 18, further including using the primary-side inductor arrangement, providing common mode currents from differential signal lines to a ground reference voltage terminal.

* * * * *